(12) United States Patent
Murashige et al.

(10) Patent No.: US 11,760,077 B2
(45) Date of Patent: Sep. 19, 2023

(54) LAMINATE FOR IMAGE DISPLAY DEVICES

(71) Applicant: NITTO DENKO CORPORATION, Ibaraki (JP)

(72) Inventors: Takeshi Murashige, Ibaraki (JP); Junichi Inagaki, Ibaraki (JP); Akiko Sugino, Ibaraki (JP); Tetsuro Ikeda, Ibaraki (JP)

(73) Assignee: NITTO DENKO CORPORATION, Osaka (JP)

( * ) Notice: Subject to any disclaimer, the term of this patent is extended or adjusted under 35 U.S.C. 154(b) by 300 days.

(21) Appl. No.: 16/759,811

(22) PCT Filed: Oct. 25, 2018

(86) PCT No.: PCT/JP2018/039743
§ 371 (c)(1),
(2) Date: Apr. 28, 2020

(87) PCT Pub. No.: WO2019/087938
PCT Pub. Date: May 9, 2019

(65) Prior Publication Data
US 2021/0178740 A1 Jun. 17, 2021

(30) Foreign Application Priority Data
Oct. 30, 2017 (JP) .................... 2017-209480

(51) Int. Cl.
*B32B 17/10* (2006.01)
*G02B 1/14* (2015.01)
(Continued)

(52) U.S. Cl.
CPC .............. *B32B 37/26* (2013.01); *B32B 7/022* (2019.01); *B32B 17/10* (2013.01);
(Continued)

(58) Field of Classification Search
CPC ..... G02B 1/00–1/18; G02B 5/30–5/305; C09J 7/385; C09J 133/06–133/12; C09J 163/00–163/10
See application file for complete search history.

(56) References Cited

U.S. PATENT DOCUMENTS

| | | | |
|---|---|---|---|
| 8,525,405 B2 * | 9/2013 | Kuwabara | G02F 1/1333 313/506 |
| 2002/0015807 A1 * | 2/2002 | Sugino | G02B 5/3033 428/1.31 |

(Continued)

FOREIGN PATENT DOCUMENTS

| CN | 1692015 A | 11/2005 |
|---|---|---|
| CN | 105467652 A | 4/2016 |

(Continued)

OTHER PUBLICATIONS

International Search Report dated Jan. 29, 2019, issued in counterpart application No. PCT/JP2018/039743 (2 pages).
(Continued)

*Primary Examiner* — Prashant J Khatri
(74) *Attorney, Agent, or Firm* — WHDA, LLP (57) ABSTRACT

Provided is a laminate that includes a thin glass film and is hence excellent in flexibility, and that is excellent in puncture resistance. A laminate for an image display apparatus of the present invention includes: a glass film; and a resin layer arranged on one side of the glass film, wherein the glass film has a thickness of more than 50 µm and 150 µm or less, wherein the laminate for an image display apparatus has a puncture strength measured in conformity with JIS Z 1707: 1997 of more than 2 kg and 50 kg or less, and wherein the laminate for an image display apparatus has a bending radius of from 15 mm to 200 mm.

5 Claims, 1 Drawing Sheet

(51) Int. Cl.
   *G02B 1/08*    (2006.01)
   *B32B 7/022*   (2019.01)
   *B32B 37/26*   (2006.01)
   *B32B 37/12*   (2006.01)
   *G09F 9/30*    (2006.01)

(52) U.S. Cl.
   CPC ........ *B32B 17/10165* (2013.01); *B32B 37/12* (2013.01); *G02B 1/08* (2013.01); *G02B 1/14* (2015.01); *B32B 2307/51* (2013.01); *B32B 2457/20* (2013.01); *G09F 9/301* (2013.01)

(56) References Cited

U.S. PATENT DOCUMENTS

| | | | |
|---|---|---|---|
| 2007/0166537 A1* | 7/2007 | Nagamoto | ............... C09J 7/385 252/582 |
| 2013/0044282 A1 | 2/2013 | Kuwabara et al. | |
| 2015/0072125 A1 | 3/2015 | Murashige et al. | |
| 2015/0146294 A1 | 5/2015 | Watanabe | |
| 2017/0044055 A1 | 2/2017 | Keite-Telgenbuscher et al. | |
| 2017/0306194 A1* | 10/2017 | Kwak | ..................... B32B 27/08 |
| 2018/0045872 A1* | 2/2018 | Kitagawa | .......... G02F 1/133528 |
| 2018/0203173 A1 | 7/2018 | Murashige et al. | |
| 2019/0322079 A1 | 10/2019 | Murashige et al. | |

FOREIGN PATENT DOCUMENTS

| | | | |
|---|---|---|---|
| EP | 0859246 A1 | 8/1998 | |
| EP | 3323609 A1 | 5/2018 | |
| JP | 2008-221746 A | 9/2008 | |
| JP | 2013-212633 A | 10/2013 | |
| JP | 2016-191904 A | 11/2016 | |
| JP | 2017-24177 A | 2/2017 | |
| JP | 2017-39227 A | 2/2017 | |
| JP | 2017-513801 A | 6/2017 | |
| WO | 2013/175767 A1 | 11/2013 | |
| WO | 2014/084045 A1 | 6/2014 | |
| WO | WO-2016136509 A1 * | 9/2016 | ............... G02B 1/08 |
| WO | 2018/079545 A1 | 5/2018 | |
| WO | 2018/174012 A1 | 9/2018 | |

OTHER PUBLICATIONS

Extended (Supplementary) European Search Report dated Jul. 6, 2021, issued in counterpart EP Application No. 18872596.4. (6 pages).

Office Action dated Apr. 18, 2022, issued in counterpart CN application No. 201880070113.5, with English translation (12 pages).

* cited by examiner

LAMINATE FOR IMAGE DISPLAY DEVICES

TECHNICAL FIELD

The present invention relates to a laminate for an image display apparatus.

BACKGROUND ART

In recent years, the weight reductions and thinning of display and lighting elements each using a liquid crystal display element or an organic EL, and of a solar cell have been advancing from the viewpoints of conveyability, storability, and a design property, and development toward continuous production by a roll-to-roll process has also been advancing. Under such situations, extremely thin glass (glass film) has heretofore been proposed as a method of imparting flexibility to glass. The glass film can be wound in a roll shape, and hence can be processed by the roll-to-roll process. For example, a method including processing a transparent electrode or the like from glass by the roll-to-roll process has heretofore been known.

Meanwhile, a touch sensor function is incorporated into a display element, in particular an apparatus, such as a mobile device or a laptop PC, and its outermost surface layer is required to have durability against pen hitting or the like. A resin material subjected to a high-hardness surface treatment called hard coating has heretofore been used in the outermost surface layer of such device. In reality, however, sufficient durability has not been obtained. In addition, the frequency of the use of tempered glass called cover glass for significantly improving the strength of such device has been increasing. However, the tempered glass is as thick as 500 μm or more, and hence there is a circumstance in which the tempered glass is hardly applicable to a device having a certain area or more, such as a laptop PC or a monitor, owing to demands for thinning and a weight reduction. In addition, the tempered glass is not suitable for curved display because the glass cannot follow the shape of a curved surface. Under such situations, an attempt has been made to use a thin glass film in the outermost surface layer. However, the glass film is thin and easy to deform, and hence there remains a problem in that the film is liable to break in, for example, the case where its surface is hit with an acute protrusion, such as a pen.

CITATION LIST

Patent Literature

[PTL 1] WO 2013-175767 A1

SUMMARY OF INVENTION

Technical Problem

The present invention has been made to solve the conventional problems, and an object of the present invention is to provide a laminate that includes a thin glass film and is hence excellent in flexibility, and that is excellent in puncture resistance.

Solution to Problem

According to one embodiment of the present invention, there is provided a laminate for an image display apparatus, including: a glass film; and a resin layer arranged on one side of the glass film, wherein the glass film has a thickness of more than 50 μm and 150 μm or less, wherein the laminate for an image display apparatus has a puncture strength measured in conformity with JIS Z 1707:1997 of more than 2 kg and 50 kg or less, and wherein the laminate for an image display apparatus has a bending radius of from 15 mm to 200 mm.

In one embodiment, the laminate for an image display apparatus includes the glass film, an adhesive layer, the resin layer, and a pressure-sensitive adhesive layer in the stated order.

In one embodiment, the laminate for an image display apparatus has a strength P represented by the following equation (1) of 500 ($10^{-4}$ (μm)$^3$ (GPa)$^2$) or more:

$$P = tg^2 \times Eg\left(ta_1 \times \sqrt{Ea_1} + \frac{tp \times Ep}{50} + ta_2 \times \sqrt{Ea_2}\right) \quad (1)$$

in the equation (1), Eg represents a modulus of elasticity of the glass film at 23° C., tg represents a thickness of the glass film, $Ea_1$ represents a modulus of elasticity of the adhesive layer at 23° C., $ta_1$ represents a thickness of the adhesive layer, Ep represents a modulus of elasticity of the resin layer at 23° C., tp represents a thickness of the resin layer, $Ea_2$ represents a modulus of elasticity of the pressure-sensitive adhesive layer at 23° C., and $ta_2$ represents a thickness of the pressure-sensitive adhesive layer.

In one embodiment, the resin layer is a polarizing plate.

In one embodiment, the polarizing plate includes a polarizer and a protective film arranged on one side of the polarizer, and the protective film and the polarizer are arranged in the stated order from a glass film side.

In one embodiment, the resin layer has a modulus of elasticity at 23° C. of from 1.5 GPa to 10 GPa.

In one embodiment, the adhesive layer has a modulus of elasticity at 23° C. of from 0.5 GPa to 15 GPa.

In one embodiment, the pressure-sensitive adhesive layer has a modulus of elasticity at 23° C. of from 0.00001 GPa to 10 GPa.

In one embodiment, a ratio (modulus of elasticity of the adhesive layer/modulus of elasticity of the pressure-sensitive adhesive layer) of a modulus of elasticity of the adhesive layer at 23° C. to a modulus of elasticity of the pressure-sensitive adhesive layer at 23° C. is from 1 to 1,000.

Advantageous Effects of Invention

According to the present invention, the laminate that includes a thin glass film and is hence excellent in flexibility, and that is excellent in puncture resistance can be provided.

DESCRIPTION OF EMBODIMENTS

A. Overall Configuration of Laminate for Image Display Apparatus

Figure 1:
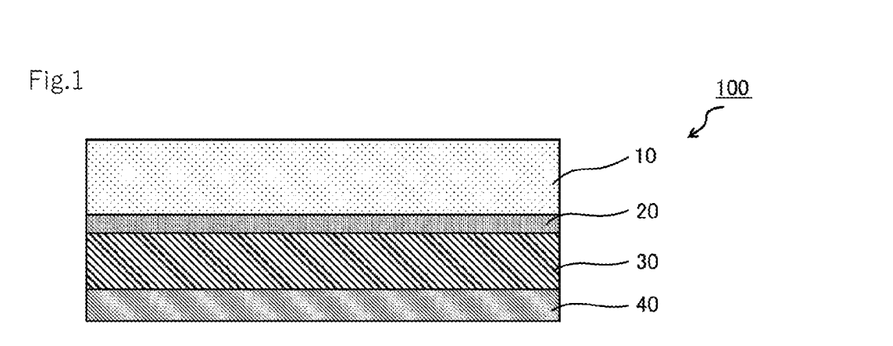
FIG. 1 is a schematic sectional view of a laminate for an image display apparatus according to one embodiment of the present invention.

FIG. 1 is a schematic sectional view of a laminate for an image display apparatus according to one embodiment of the present invention. A laminate 100 for an image display apparatus illustrated in FIG. 1 includes a glass film 10 and a resin layer 30 arranged on one side of the glass film 10. The laminate 100 for an image display apparatus preferably further includes an adhesive layer 20 between the glass film 10 and the resin layer 30. In addition, the laminate 100 for an image display apparatus preferably further includes a pressure-sensitive adhesive layer 40 on the side of the resin layer 30 opposite to the glass film 10. In one embodiment, the adhesive layer 20 and the pressure-sensitive adhesive layer 40 may be arranged on the resin layer 30 directly (i.e., without any other layer being interposed). In addition, the adhesive layer 20 may be directly arranged on the glass film 10. The term "adhesive layer" as used herein refers to a layer capable of bonding substances to each other by being interposed between the substances. Therefore, when an adherend bonded to the adhesive layer is peeled, the adhesive layer is free of any practical adhesive strength. In addition, the term "pressure-sensitive adhesive layer" refers to a substance that has an adhesive property at normal temperature, and that is bonded to an adherend with a light pressure. Therefore, even when the adherend bonded to the pressure-sensitive adhesive layer is peeled, the pressure-sensitive adhesive layer holds a practical pressure-sensitive adhesive strength.

Figure 2:
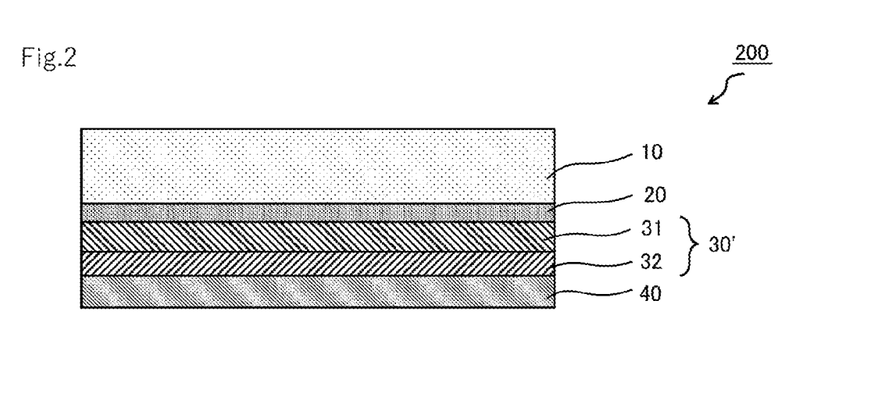
FIG. 2 is a schematic sectional view of a laminate for an image display apparatus according to another embodiment of the present invention.

In one embodiment, the resin layer may be a polarizing plate. FIG. 2 is a schematic sectional view of a laminate for an image display apparatus according to another embodiment of the present invention. A laminate 200 for an image display apparatus illustrated in FIG. 2 includes the glass film 10 and a polarizing plate 30' arranged on one side of the glass film 10. In one embodiment, as illustrated in FIG. 2, the polarizing plate 30' includes a polarizer 32 and a protective film 31 arranged on at least one side of the polarizer 32. When the protective film 31 is arranged only on one side of the polarizer 32, the protective film 31 and the polarizer 32 are preferably arranged in the stated order from the glass film 10 side. When the protective film 31 is arranged at such position, a laminate for an image display apparatus excellent in puncture strength can be obtained. The protective film may be arranged on each of both surfaces of the polarizer as required. Similarly to the laminate for an image display apparatus illustrated in FIG. 1, the laminate 200 for an image display apparatus preferably further includes the adhesive layer 20 between the glass film 10 and the polarizing plate 30'. In addition, the laminate 200 for an image display apparatus preferably further includes the pressure-sensitive adhesive layer 40 on the side of the polarizing plate 30' opposite to the glass film 10. In one embodiment, the adhesive layer 20 and the pressure-sensitive adhesive layer 40 may be arranged on the polarizing plate 30' directly (i.e., without any other layer being interposed). In addition, the adhesive layer 20 may be directly arranged on the glass film 10.

The laminate 100 for an image display apparatus of the present invention has a high hardness because the laminate includes the glass film 10. In addition, the laminate 100 for an image display apparatus of the present invention includes the resin layer 30 (the polarizing plate 30') on one side of the glass film 10. Accordingly, the breakage of the glass film 10 can be prevented, and hence the laminate is excellent in puncture resistance. In the present invention, the laminate is considered to be excellent in puncture resistance as described above because point compression applied to the surface of the glass film 10 (surface opposite to the polarizer) can be effectively caused to escape toward the resin layer 30.

The puncture strength of the laminate for an image display apparatus of the present invention measured in conformity with JIS Z 1707:1997 is more than 2 kg and 50 kg or less, preferably from 4 kg to 30 kg, more preferably from 4 kg to 20 kg. When the puncture strength falls within such range, both of the bendability and puncture strength of the laminate can be achieved.

The bending radius of the laminate for an image display apparatus of the present invention is from 15 mm to 200 mm, preferably from 30 mm to 150 mm, more preferably from 50 mm to 100 mm. When the bending radius falls within such range, the above-mentioned effect becomes significant. The "bending radius" may be measured by: preparing poles having different outer diameters; and pressing and bending the laminate for an image display apparatus along the curved surfaces of the poles. The "bending radius" corresponds to the outer diameter of any one of the polls when the laminate for an image display apparatus is maximally bent to the extent that the laminate is not damaged. The "bending radius" is measured under a state in which the glass film is convex (i.e., the glass film faces outward and the resin layer faces inward).

The thickness of the laminate for an image display apparatus of the present invention is preferably from 50 μm to 500 μm, more preferably from 100 μm to 400 μm, still more preferably from 120 μm to 300 μm.

In one embodiment, the laminate for an image display apparatus of the present invention has a strength P represented by the following equation (1) of 500 $(10^{-4}$ $(\mu m)^3$ $(GPa)^2)$ or more:

$$P = tg^2 \times Eg\left(ta_1 \times \sqrt{Ea_1} + \frac{tp \times Ep}{50} + ta_2 \times \sqrt{Ea_2}\right) \quad (1)$$

in the equation (1), Eg represents a modulus of elasticity of the glass film 10 at 23° C., tg represents a thickness of the glass film 10, $Ea_1$ represents a modulus of elasticity of the adhesive layer 20 at 23° C., $ta_1$ represents a thickness of the adhesive layer 20, Ep represents a modulus of elasticity of the resin layer 30, 30' at 23° C., tp represents a thickness of the resin layer 30, 30', $Ea_2$ represents a modulus of elasticity of the pressure-sensitive adhesive layer 40 at 23° C., and $ta_2$ represents a thickness of the pressure-sensitive adhesive layer 40.

In one embodiment, when the adhesive layer 20 and the pressure-sensitive adhesive layer 40 are directly arranged on the resin layer 30, 30', and the adhesive layer 20 is directly arranged on the glass film 10, the strength P of a laminate having the configuration "glass film 10/adhesive layer 20/resin layer 30, 30'/pressure-sensitive adhesive layer 40" is 500 $(10^{-4}$ $(\mu m)^3 (GPa)^2)$ or more. Without being bound by any particular theory, a relationship among the glass film serving as the outermost surface layer, the adhesive layer, the resin layer, and the pressure-sensitive adhesive layer may be considered to be as described below. The puncture strength of the glass film is weighted by the puncture strengths of the three respective layers, that is, the adhesive layer, the pressure-sensitive adhesive layer, and the resin layer serving as coefficients therefor. Equations representing the weights are obtained from consistency with experimental results. The fact that the parameter is specified by the thicknesses and the moduli of elasticity is valid when the parameter is considered in terms of mechanical strength.

In this description, the moduli of elasticity of the glass film, the resin layer, and the adhesive layer may be measured with an autograph (details about a measurement method are described later). In addition, the modulus of elasticity of the pressure-sensitive adhesive layer may be measured with a viscoelasticity-measuring apparatus (details about a measurement method are described later).

The laminate for an image display apparatus of the present invention may further include other layers. Examples of the other layers include an antireflection layer, an antiglare layer, an antistatic layer, and a conductive layer. A separator may be arranged on a surface of the pressure-sensitive adhesive layer. The separator can protect the pressure-sensitive adhesive layer until the laminate for an image display apparatus is put into practical use. In one embodiment, no other layer is arranged on the surface of the glass film opposite to the resin layer (i.e., the glass film is exposed). In addition, in order to prevent, for example, the adhesion of foreign matter to the surface of the exposed glass film, any appropriate protective material may be temporarily arranged on the surface of the glass film.

The laminate for an image display apparatus of the present invention may be used in, for example, the substrate of a display element for an image display apparatus. In another aspect of the present invention, an image display apparatus including the laminate for an image display apparatus is provided. In one embodiment, the laminate for an image display apparatus of the present invention may be arranged on the outermost side on the viewer side of the image display apparatus. The laminate for an image display apparatus arranged as described above may function as a front surface protective plate for the image display apparatus.

B. Glass Film

Any appropriate glass film may be adopted as the glass film. According to classification based on composition, examples of the glass film include soda-lime glass, borate glass, aluminosilicate glass, and quartz glass films. In addition, according to classification based on an alkali component, examples of the glass film include alkali-free glass and low-alkali glass films. The content of an alkali metal component (e.g., $Na_2O$, $K_2O$, $Li_2O$) in the glass is preferably 15 wt % or less, more preferably 10 wt % or less.

The thickness of the glass film is preferably from 30 μm to 300 μm, more preferably more than 50 μm and 300 μm or less, still more preferably from 70 μm to 150 μm, particularly preferably from 80 μm to 120 μm. When the thickness falls within such range, a laminate for an image display apparatus having the following features can be obtained: the laminate is excellent in flexibility; and the glass film hardly breaks, and hence the laminate is excellent in productivity.

The glass film preferably has a light transmittance at a wavelength of 550 nm of 85% or more. The glass film preferably has a refractive index at a wavelength of 550 nm of from 1.4 to 1.65.

The glass film has a density of preferably from 2.3 g/cm³ to 3.0 g/cm³, more preferably from 2.3 g/cm³ to 2.7 g/cm³. When the glass film has a density falling within the range, a lightweight laminate for an image display apparatus is obtained.

Any appropriate method may be adopted as a forming method for the glass film. The glass film is typically produced by melting a mixture containing a main raw material, such as silica or alumina, a fining agent, such as salt cake or antimony oxide, and a reducing agent, such as carbon, at a temperature of from 1,400° C. to 1,600° C., and forming the molten mixture into a thin sheet shape, followed by cooling. Examples of the forming method for the glass film include a slot down-draw method, a fusion method, and a float method. The glass film formed in a sheet shape by any one of those methods may be chemically polished with a solvent, such as hydrofluoric acid, as required, in order to reduce its thickness or enhance its smoothness.

C. Resin Layer

Examples of the resin layer include a polarizing plate, a retardation plate, an isotropic film, and a conductive film. The resin layer may include a single layer, or may include a plurality of layers.

Any appropriate material is used as a material for forming the resin layer. Examples of the material for forming the resin layer include a polyolefin-based resin, a cyclic olefin-based resin, a polycarbonate-based resin, a cellulose-based resin, a polyester-based resin, a polyamide-based resin, a polyimide-based resin, a polyether-based resin, a polystyrene-based resin, a (meth)acrylic resin, a (meth)acrylic urethane-based resin, a polysulfone-based resin, an acetate-based resin, an epoxy-based resin, a silicone-based resin, a polyarylate-based resin, a polysulfone-based resin, a polyetherimide-based resin, an epoxy-based resin, a urethane-based resin, a silicone-based resin, and a polyvinyl alcohol (PVA)-based resin.

The thickness of the resin layer is preferably from 25 μm to 300 μm, more preferably from 30 μm to 250 μm, still more preferably from 50 μm to 200 μm, particularly preferably from 50 μm to 100 μm.

The modulus of elasticity of the resin layer at 23° C. is preferably from 2 GPa to 10 GPa, more preferably from 2 GPa to 5 GPa, still more preferably from 2 GPa to 4 GPa. When the modulus of elasticity falls within such range, a laminate for an image display apparatus excellent in puncture resistance can be obtained.

C-1. Polarizing Plate

As described above, in one embodiment, the resin layer is a polarizing plate. The polarizing plate includes a polarizer and a protective film arranged on at least one side of the polarizer. The thickness of the polarizing plate is preferably from 5 μm to 300 μm, more preferably from 10 μm to 250 μm, still more preferably from 25 μm to 200 μm, particularly preferably from 25 μm to 100 μm.

C-1-1. Polarizer

The thickness of the polarizer is not particularly limited, and an appropriate thickness may be adopted depending on purposes. The thickness is typically from about 1 μm to about 80 μm. In one embodiment, a thin polarizer is used, and the thickness of the polarizer is preferably 20 μm or less, more preferably 15 μm or less, still more preferably 10 μm or less, particularly preferably 6 μm or less. With the use of such thin polarizer, a thin laminate for an image display apparatus can be obtained.

The polarizer preferably exhibits absorption dichroism at any wavelength in the wavelength range of from 380 nm to 780 nm. The polarizer has a single axis transmittance of preferably 40.0% or more, more preferably 41.0% or more, still more preferably 42.0% or more, particularly preferably 43.0% or more. The polarizer has a polarization degree of preferably 99.8% or more, more preferably 99.9% or more, still more preferably 99.95% or more.

The polarizer is preferably an iodine-based polarizer. More specifically, the polarizer may be formed of an iodine-containing polyvinyl alcohol-based resin (hereinafter referred to as "PVA-based resin") film.

Any appropriate resin may be adopted as a PVA-based resin for forming the PVA-based resin film. Examples of the resin include polyvinyl alcohol and an ethylene-vinyl alcohol copolymer. The polyvinyl alcohol is obtained by saponifying polyvinyl acetate. The ethylene-vinyl alcohol copolymer is obtained by saponifying an ethylene-vinyl acetate copolymer. The saponification degree of the PVA-based resin is typically from 85 mol % to 100 mol %, preferably from 95.0 mol % to 99.95 mol %, more preferably from 99.0 mol % to 99.93 mol %. The saponification degree may be determined in conformity with JIS K 6726-1994. The use of the PVA-based resin having such saponification degree can provide a polarizer excellent in durability. When the saponification degree is excessively high, gelling may occur.

The average polymerization degree of the PVA-based resin may be appropriately selected depending on purposes. The average polymerization degree is typically from 1,000 to 10,000, preferably from 1, 200 to 5,000, more preferably from 1, 500 to 4, 500. The average polymerization degree may be determined in conformity with JIS K 6726-1994.

A production method for the polarizer is, for example, a method (I) including stretching and dyeing a PVA-based resin film alone, or a method (II) including stretching and dyeing a laminate (i) having a resin substrate and a polyvinyl alcohol-based resin layer. Detailed description of the method (I) is omitted because the method is well known and commonly used in the art. The production method (II) preferably includes the step of stretching and dyeing the laminate (i) having the resin substrate and the polyvinyl alcohol-based resin layer formed on one side of the resin substrate to produce a polarizer on the resin substrate. The laminate (i) may be formed by applying an application liquid containing a polyvinyl alcohol-based resin onto the resin substrate and drying the applied liquid. In addition, the laminate (i) may be formed by transferring a polyvinyl alcohol-based resin film onto the resin substrate. For example, details about the production method (II) are described in JP 2012-73580 A, which is incorporated herein by reference.

C-1-2. Protective Film

Any appropriate resin film may be adopted as the protective film. As a material for forming the protective film, there are given, for example: a polyester-based resin, such as polyethylene terephthalate (PET); a cellulose-based resin, such as triacetylcellulose (TAC); a cycloolefin-based resin, such as a norbornene-based resin; an olefin-based resin, such as polyethylene or polypropylene; and a (meth)acrylic resin. Of those, polyethylene terephthalate (PET) is preferred. The term "(meth)acrylic resin" refers to an acrylic resin and/or a methacrylic resin.

In one embodiment, a (meth)acrylic resin having a glutarimide structure is used as the (meth)acrylic resin. The (meth)acrylic resin having a glutarimide structure (hereinafter sometimes referred to as glutarimide resin) is described in, for example, JP 2006-309033 A, JP 2006-317560 A, JP 2006-328329 A, 2006-328334 A, JP 2006-337491 A, JP 2006-337492 A, JP 2006-337493 A, JP 2006-337569 A, JP 2007-009182 A, JP 2009-161744 A, and JP 2010-284840 A. The descriptions thereof are incorporated herein by reference.

The protective film and the polarizer are laminated via any appropriate adhesive layer. The resin substrate used at the time of the production of the polarizer may be peeled before the lamination of the protective film and the polarizer, or after the lamination.

The thickness of the protective film is preferably from 4 μm to 250 μm, more preferably from 5 μm to 150 μm, still more preferably from 10 μm to 100 μm, particularly preferably from 10 μm to 50 μm.

The modulus of elasticity of the protective film at 23° C. is preferably from 1 GPa to 10 GPa, more preferably from 2 GPa to 7 GPa, still more preferably from 2 GPa to 5 GPa. When the modulus of elasticity falls within such range, a laminate for an image display apparatus excellent in puncture resistance can be obtained. In this description, the modulus of elasticity of the protective film may be measured with an autograph (details about a measurement method are described later).

D. Adhesive Layer

The adhesive layer is formed of any appropriate adhesive. Examples of the adhesive include a polyester-based adhesive, a polyurethane-based adhesive, a polyvinyl alcohol-based adhesive, and an epoxy-based adhesive. Of those, an epoxy-based adhesive is preferred. This is because particularly satisfactory adhesiveness can be obtained.

When the adhesive is a thermosetting adhesive, the adhesive can exhibit a peel-resisting force by being cured (solidified) through heating. In addition, when the adhesive is a photocurable adhesive, such as a UV-curable adhesive, the adhesive can exhibit a peel-resisting force by being cured through irradiation with light, such as UV light. In addition, when the adhesive is a moisture-curable adhesive, the adhesive may react with, for example, moisture in air to cure. Accordingly, the adhesive can cure to exhibit a peel-resisting force even by being left to stand.

For example, a commercial adhesive may be used as the adhesive, or the adhesive may be prepared as an adhesive solution (or dispersion liquid) by dissolving or dispersing various curable resins in a solvent.

The thickness of the adhesive layer is preferably from 1 μm to 30 μm, more preferably from 1 μm to 20 μm, still more preferably from 5 μm to 10 μm. When the thickness falls within such range, a laminate for an image display apparatus that is excellent in flexibility and is excellent in puncture resistance can be obtained.

The modulus of elasticity of the adhesive layer at 23° C. is preferably from 0.5 GPa to 15 GPa, more preferably from 0.8 GPa to 10 GPa, still more preferably from 1 GPa to 5 GPa. When the modulus of elasticity falls within such range, a laminate for an image display apparatus that is excellent in flexibility and is excellent in puncture resistance can be obtained.

The ratio (modulus of elasticity of the adhesive layer/modulus of elasticity of the pressure-sensitive adhesive layer) of the modulus of elasticity of the adhesive layer at 23° C. to the modulus of elasticity of the pressure-sensitive adhesive layer at 23° C. is preferably from 1 to 1,000, more preferably from 10 to 500. When the ratio falls within such range, a laminate for an image display apparatus that is excellent in puncture resistance and is excellent in puncture strength can be obtained.

E. Pressure-Sensitive Adhesive Layer

The pressure-sensitive adhesive layer is formed of any appropriate adhesive. A pressure-sensitive adhesive containing, for example, an acrylic polymer, a silicone-based polymer, polyester, polyurethane, polyamide, polyether, or a fluorine-based or rubber-based polymer as a base polymer is used as the pressure-sensitive adhesive. Of those, an acrylic pressure-sensitive adhesive is preferably used. This is because the acrylic pressure-sensitive adhesive is excellent in optical transparency, shows moderate wettability, moderate cohesiveness, and a moderate pressure-sensitive adhesive characteristic, such as an adhesive property, and may be excellent in, for example, weatherability and heat resistance. An acrylic pressure-sensitive adhesive formed of an acrylic polymer having 4 to 12 carbon atoms is particularly preferred.

The thickness of the pressure-sensitive adhesive layer is preferably from 1 μm to 100 μm, more preferably from 3 μm to 80 μm, still more preferably from 3 μm to 50 μm. When the thickness falls within such range, a laminate for an image display apparatus that is excellent in flexibility and is excellent in puncture resistance can be obtained.

The modulus of elasticity of the pressure-sensitive adhesive layer at 23° C. is preferably from 0.00001 GPa to 10 GPa, more preferably from 0.001 GPa to 8 GPa, still more preferably from 0.001 GPa to 5 GPa. When the modulus of elasticity falls within such range, a laminate for an image display apparatus that is excellent in flexibility and is excellent in puncture resistance can be obtained. A method of measuring the modulus of elasticity of the pressure-sensitive adhesive layer is described later.

In one embodiment, when the thickness of the glass film is 70 μm or more, the modulus of elasticity of the pressure-sensitive adhesive layer at 23° C. is preferably from 0.00001 GPa to 1 GPa, more preferably from 0.00001 GPa to 0.1 GPa. In another embodiment, when the thickness of the glass film is less than 70 μm, the modulus of elasticity of the pressure-sensitive adhesive layer at 23° C. is preferably from 0.5 GPa to 8 GPa, more preferably from 1 GPa to 4 GPa. When the modulus of elasticity of the pressure-sensitive adhesive layer is regulated in accordance with the thickness of the glass film, a laminate for an image display apparatus that is excellent in flexibility and is excellent in puncture resistance can be obtained.

F. Others

In the present invention, in order to set the puncture strength measured in conformity with JIS Z 1707:1997 to more than 2 kg and 50 kg or less, and to set the bending radius to from 15 mm to 200 mm, elements described in the section B to the section E can be appropriately combined to achieve such settings; for example, the settings may be preferably achieved by any one of the following embodiment modes.

Embodiment Mode (1)

When the thickness of the glass film is 30 μm or more and 60 μm or less, a laminate for an image display apparatus is produced by: setting the modulus of elasticity of the adhesive layer at 23° C. to 1 GPa or more and 5 GPa or less; setting the thickness of the polarizing plate to 25 μm or more and 200 μm or less; setting the thickness of the pressure-sensitive adhesive layer to 3 μm or more and 50 μm or less; and setting the modulus of elasticity of the pressure-sensitive adhesive layer at 23° C. to 1 GPa or more and 4 GPa or less.

Embodiment Mode (2)

When the thickness of the glass film is 70 μm or more and 120 μm or less, a laminate for an image display apparatus is produced by: setting the modulus of elasticity of the adhesive layer at 23° C. to 1 GPa or more and 5 GPa or less; setting the thickness of the polarizing plate to 25 μm or more and 200 μm or less; setting the thickness of the pressure-sensitive adhesive layer to 3 μm or more and 50 μm or less; and setting the modulus of elasticity of the pressure-sensitive adhesive layer at 23° C. to 0.00001 GPa or more and 0.1 GPa or less.

EXAMPLES

The present invention is specifically described below by way of Examples, but the present invention is not limited to these Examples. In addition, in Examples, "part(s)" and "%" are by weight unless otherwise specified.

[Production Example 1] Preparation of Polarizing Plate A (Preparation of Polarizer)

First, a laminate obtained by forming a 9-micrometer thick PVA layer on an amorphous PET substrate was subjected to in-air auxiliary stretching at a stretching temperature of 130° C. to produce a stretched laminate. Next, the stretched laminate was subjected to dyeing to produce a colored laminate. Further, the colored laminate was subjected to in-boric-acid-solution stretching at a stretching temperature of 65° C. so that the total stretching ratio became 5.94 times. Thus, an optical film laminate including a 4-micrometer thick PVA layer stretched together with the amorphous PET substrate was produced. Such two-stage stretching was able to produce an optical film laminate including the 4-micrometer thick PVA layer, the layer forming such a high-function polarizer that the PVA molecules of the PVA layer formed on the amorphous PET substrate were aligned in a high order, and iodine caused to adsorb to the polarizer by the dyeing was aligned as a polyiodide ion complex in one direction in a high order.

(Preparation of Acrylic Film)

A methacrylic resin pellet having a glutarimide ring unit was dried at 100.5 kPa and 100° C. for 12 hours, and was extruded from the T-die of a uniaxial extruder at a die temperature of 270° C. to be formed into a film shape. The film was stretched in its conveying direction (MD direction) under an atmosphere having a temperature higher than the Tg of the resin by 10° C. Next, the film was stretched in the direction (TD direction) perpendicular to the film-conveying direction under an atmosphere having a temperature higher than the Tg of the resin by 7° C. Thus, an acrylic film having a thickness of 40 μm was obtained.

(Preparation of Curable Adhesive)

35 Parts by weight of N-hydroxyethyl acrylamide HEAA (manufactured by Kohjin Co., Ltd.), 45 parts by weight of N-acryloylmorpholine ACMO (manufactured by Kohjin Co., Ltd.), 25 parts by weight of polypropylene glycol diacrylate TPGDA (manufactured by Toagosei Co., Ltd., product name: "ARONIX M-220"), 3 parts by weight of a photopolymerization initiator (manufactured by Ciba Specialty Chemicals, product name: "IRGACURE 184"), and 1.5 parts by weight of another photopolymerization initiator (manufactured by Nippon Kayaku Co., Ltd., product name: "KAYACURE DETX-S") were added as an adhesive.

(Production of Polarizing Plate)

The curable adhesive was applied in an application thickness of about 1 μm onto the polarizer produced on the PET substrate. Next, the acrylic film having a thickness of 40 μm was bonded to the adhesive layer. The adhesive was irradiated with UV light having a peak UV irradiance of 1,600 mW/cm$^2$ and a UV integrated light quantity of 1,000 mJ/cm$^2$ (wavelength: from 380 nm to 440 nm), which had been emitted from a conveyor-type UV irradiation apparatus (manufactured by FUSION UV SYSTEMS), from the PET substrate side to be cured, and the cured adhesive was dried at 70° C. for 2 minutes. Finally, the PET substrate was peeled from the laminate obtained by laminating the acrylic film, the polarizer, and the PET substrate. Thus, a laminate (a polarizing plate A having a thickness of 44 μm) of the acrylic film (protective film) and the polarizer was obtained.

[Production Example 2] Preparation of Polarizing Plate B

A polyvinyl alcohol film (PVA) having a thickness of 80 μm was stretched at up to 3 times between rolls having different speed ratios while being dyed in an iodine solution at 30° C. having a concentration of 0.3% for 1 minute. After that, the film was stretched so that the total stretching ratio became 6 times while being immersed in an aqueous solution at 60° C. containing boric acid at a concentration of 4% and potassium iodide at a concentration of 10% for 0.5 minute. Next, the film was washed by being immersed in an aqueous solution at 30° C. containing potassium iodide at a concentration of 1.5% for 10 seconds. After that, the film was dried at 50° C. for 4 minutes to provide a polarizer having a thickness of 20 μm. A 40-micrometer thick triacetylcellulose film (TAC) subjected to a saponification treatment was bonded to one surface of the polarizer with a polyvinyl alcohol-based adhesive, and a 33-micrometer thick norbornene-based film was bonded to the other surface thereof with the adhesive. Thus, a polarizing plate B (thickness: 93 μm) was obtained.

[Production Example 3] Preparation of Polarizing Plate C

A polarizing plate C (thickness: 137 μm) was obtained in the same manner as in Production Example 2 except that: the thickness of the TAC film was changed to 100 μm; and the thickness of the polarizer was changed to 4 μm.

[Production Example 4] Preparation of Polarizing Plate D

A TAC film (thickness: 100 μm) was bonded to the surface of the polarizer of the polarizing plate A prepared in Production Example 1 opposite to the acrylic film (protective film) via an adhesive layer (thickness: 5 μm) including an adhesive prepared in Production Example 7 below. Thus, a polarizing plate D (thickness: 149 μm) having the configuration "acrylic film/polarizer/TAC film" was obtained.

[Production Example 5] Preparation of Polarizing Plate E

A TAC film (thickness: 100 μm) was bonded to the surface of the polarizer of the polarizing plate A prepared in Production Example 1 opposite to the acrylic film (protective film) via an adhesive layer (thickness: 20 μm) including a pressure-sensitive adhesive prepared in Production Example 6 below. Thus, a polarizing plate E (thickness: 164 μm) having the configuration "acrylic film/polarizer/TAC film" was obtained.

[Production Example 6] Preparation of Pressure-Sensitive Adhesive (Preparation of Acrylic Polymer)
100 Parts by weight of butyl acrylate, 5 parts by weight of acrylic acid, and 0.075 part by weight of 2-hydroxyethyl acrylate, 0.2 part by weight of 2,2'-azobisisobutyronitrile serving as a polymerization initiator, and 200 parts by weight of ethyl acetate serving as a polymerization solvent were loaded into a four-necked flask including a stirring blade, a temperature gauge, a nitrogen gas-introducing tube, and a condenser. After air in the flask had been sufficiently purged with nitrogen, the mixed liquid, whose temperature in the flask was kept at around 55° C., was subjected to a polymerization reaction for 10 hours while being stirred in a stream of nitrogen. Thus, an acrylic polymer solution was prepared. The acrylic polymer had a weight-average molecular weight of 2,200,000.

(Preparation of Pressure-sensitive Adhesive Composition)
100 Parts by weight of the solid content of the acrylic polymer solution was uniformly mixed with 0.2 part by weight of dibenzoyl peroxide (NYPER BMT, manufactured by Nippon Oil & Fats Co., Ltd.) serving as a peroxide, 0.05 part by weight of diglycidylaminomethylcyclohexane (manufactured by Mitsubishi Gas Chemical Company, Inc., TETRAD-C) serving as an epoxy-based cross-linking agent, 0.1 part by weight of a trimethylolpropane-tolylene diisocyanate adduct (manufactured by Nippon Polyurethane Industry Co., Ltd., CORONATE L) serving as an isocyanate-based cross-linking agent, and 0.075 part by weight of a silane coupling agent (manufactured by Shin-Etsu Chemical Co., Ltd., KBM-403), followed by stirring. Thus, an acrylic pressure-sensitive adhesive (solid content: 10.9 wt %) was prepared.

[Production Example 7] Preparation of Adhesive (Preparation of Epoxy Adhesive)
70 Parts by weight of CELLOXIDE 2021P (manufactured by Daicel Chemical Industries, Ltd.), 5 parts by weight of EHPE 3150, 19 parts by weight of ARON OXETANE OXT-221 (manufactured by Toagosei Co., Ltd.), 4 parts by weight of KBM-403 (manufactured by Shin-Etsu Chemical Co., Ltd.), and 2 parts by weight of CPI-101A (manufactured by San-Apro Ltd.) were compounded to prepare an epoxy adhesive.

Example 1

A glass film (manufactured by Nippon Electric Glass Co., Ltd; product name: "OA-10G", thickness: 100 μm) and the polarizing plate A produced in Production Example 1 were bonded to each other via an adhesive layer (thickness: 5 μm) including the adhesive prepared in Production Example 7. At this time, the polarizing plate A was arranged so that its protective film was on the glass film side. Next, the adhesive layer was irradiated with UV light (500 mJ/cm$^2$) from a high-pressure mercury lamp. Thus, the adhesive layer was cured.

Further, a pressure-sensitive adhesive layer (thickness: 20 μm) including the pressure-sensitive adhesive prepared in Production Example 6 was formed on the polarizer side of the polarizing plate. Thus, a laminate for an image display apparatus was obtained.

The pressure-sensitive adhesive layer was formed as follows: (i) the pressure-sensitive adhesive was applied onto a silicone-treated polyethylene terephthalate film (manufactured by Mitsubishi Chemical Polyester Film Co., Ltd., thickness: 38 μm), and was heated at 155° C. for 1 minute to form the pressure-sensitive adhesive layer having a thickness after the drying of 20 μm; and (ii) the pressure-sensitive adhesive layer was transferred from the polyethylene terephthalate film onto the polarizer to provide the laminate for an image display apparatus including the pressure-sensitive adhesive layer.

Example 2

A laminate for an image display apparatus was obtained in the same manner as in Example 1 except that the polarizing plate B was used instead of the polarizing plate A.

Example 3

A laminate for an image display apparatus was obtained in the same manner as in Example 1 except that the polarizing plate C was used instead of the polarizing plate A.

Example 4

A laminate for an image display apparatus was obtained in the same manner as in Example 1 except that the polarizing plate D was used instead of the polarizing plate A. The polarizing plate D was arranged so that its TAC film was on the glass film side.

Example 5

A laminate for an image display apparatus was obtained in the same manner as in Example 2 except that a glass film (manufactured by Nippon Electric Glass Co., Ltd., product name: "OA-10G", thickness: 70 µm) was used instead of the glass film (manufactured by Nippon Electric Glass Co., Ltd., product name: "OA-10G", thickness: 100 µm).

Comparative Example 1

A laminate for an image display apparatus was obtained in the same manner as in Example 1 except that a glass film (manufactured by Nippon Electric Glass Co., Ltd., product name: "OA-10G", thickness: 50 µm) was used instead of the glass film (manufactured by Nippon Electric Glass Co., Ltd., product name: "OA-10G", thickness: 100 µm).

Comparative Example 2

A laminate for an image display apparatus was obtained in the same manner as in Comparative Example 1 except that the polarizing plate B was used instead of the polarizing plate A.

Comparative Example 3

A laminate for an image display apparatus was obtained in the same manner as in Comparative Example 1 except that the polarizing plate C was used instead of the polarizing plate A.

Comparative Example 4

A glass film (manufactured by Nippon Electric Glass Co., Ltd., product name: "OA-10G", thickness: 100 µm), a pressure-sensitive adhesive layer (thickness: 20 µm) including the pressure-sensitive adhesive prepared in Production Example 6, the polarizing plate A, and another pressure-sensitive adhesive layer (thickness: 20 µm) including the pressure-sensitive adhesive prepared in Production Example 6 were laminated in the stated order to provide a laminate for an image display apparatus. The polarizing plate A was arranged so that its protective film was on the glass film side.

Comparative Example 5

A laminate for an image display apparatus was obtained in the same manner as in Comparative Example 4 except that a glass film (manufactured by Nippon Electric Glass Co., Ltd., product name: "OA-10G", thickness: 200 µm) was used instead of the glass film (manufactured by Nippon Electric Glass Co., Ltd., product name: "OA-10G", thickness: 100 µm).

Comparative Example 6

A glass film (manufactured by Nippon Electric Glass Co., Ltd; product name: "OA-10G", thickness: 50 µm), a pressure-sensitive adhesive layer (thickness: 20 µm) including the pressure-sensitive adhesive prepared in Production Example 6, a TAC film (thickness: 100 µm), and another pressure-sensitive adhesive layer (thickness: 20 µm) including the pressure-sensitive adhesive prepared in Production Example 6 were laminated in the stated order to provide a laminate for an image display apparatus.

Comparative Example 7

A TAC film (thickness: 100 µm), a pressure-sensitive adhesive layer (thickness: 20 µm) including the pressure-sensitive adhesive prepared in Production Example 6, the polarizing plate E, and another pressure-sensitive adhesive layer (thickness: 20 µm) including the pressure-sensitive adhesive prepared in Production Example 6 were laminated in the stated order to provide a laminate for an image display apparatus. The polarizing plate E was arranged so that its TAC film was on the glass film side.

<Evaluation>

The laminates for image display apparatus obtained in Examples, Comparative Examples, and Reference Example were subjected to the following evaluations. The results are shown in Table 1.

1. Modulus of Elasticity (Modulus of Elasticity of Pressure-Sensitive Adhesive Layer)

The storage modulus of elasticity of a pressure-sensitive adhesive layer at 23° C. was measured with a viscoelasticity-measuring apparatus ARES (manufactured by TA Instruments, Inc.). That is, the pressure-sensitive adhesive layer was formed into a sheet shape having a thickness of 2 mm, and the sheet was punched into a shape in accordance with parallel plates each having a diameter of 25 mm, followed by its mounting between the chucks of the apparatus. Then, the temperature of the layer was increased from −70° C. to 150° C. at a rate of temperature increase of 5° C./min while strain was applied thereto at a frequency of 1 Hz, followed by the measurement of its storage modulus of elasticity at 23° C.

(Moduli of Elasticity of Adhesive Layer, Polarizing Plate, Resin Layer, and Glass Film)

A strip-shaped sample having a thickness of 50 µm, a width of 2 cm, and a length of 15 cm was produced, and its modulus of elasticity was measured with an autograph (manufactured by Shimadzu Corporation, AG-I) from the elongation of the strip-shaped sample in its lengthwise direction and a stress. Test conditions were as follows: a chuck-to-chuck distance was set to 10 cm, and a tensile rate was set to 10 mm/min.

2. Bendability

Vinyl chloride-made poles having different outer diameters were prepared so that their radii ranged from 20 mm to 100 mm in increments of 10 mm. A bending test was performed by: bending a sample along any one of the poles so that its glass film side (in each of Comparative Examples 7 and 8, its TAC film side serving as the outermost surface layer) faced outward; confirming the degree of bending of the sample on the basis of whether both sides thereof could be or could not be fixed with CELLOTAPE (trademark) manufactured by Nichiban Co., Ltd. (CT405AP-24, pressure-sensitive adhesive strength: 3.93 N/10 cm), or the sample broke; and measuring the bending radius thereof. A sample size was as follows: the length of its short side was set to 20 mm, and the length of its long side was set to the radius of the outer diameter of each pole.

3. Method of Evaluating Puncture Strength

A 5-centimeter square laminate was bonded to a glass plate to provide an evaluation sample. A jig for a film puncture test (TKS-20N/250N (in conformity with JIS Z 1707:1997, manufactured by Imada Co., Ltd.)) was attached to a motorized vertical force gauge stand (manufactured by Nidec-Shimpo Corporation). The evaluation sample was placed on the stage of the stand, and the sample was punctured with a puncture rod (0.5 mm) at a rate of 20 mm/min. An indentation load when the glass broke was measured with the force gauge and adopted as the puncture strength of the sample.

4. Pencil Hardness

The pencil hardness of the surface of a laminate for an image display apparatus opposite to its pressure-sensitive adhesive layer (i.e., the surface of its glass film or the surface of its TAC film) was measured in conformity with the pencil hardness test of JIS K 5600-5-4 (provided that a load of 500 g was applied thereto).

5. Strength P

A strength P described in the section A was calculated.

TABLE 1

| | | Example 1 | Example 2 | Example 3 | Example 4 | Example 5 |
|---|---|---|---|---|---|---|
| Configuration | | Glass film Thickness: 100 μm Modulus of elasticity: 73 GPa Adhesive layer Thickness: 5 μm Modulus of elasticity: 2.2 GPa Polarizing plate A Thickness: 44 μm Modulus of elasticity: 2.1 GPa Pressure-sensitive adhesive layer Thickness: 20 μm Modulus of elasticity: $2 \times 10^{-3}$ GPa | Glass film Thickness: 100 μm Modulus of elasticity: 73 GPa Adhesive layer Thickness: 5 μm Modulus of elasticity: 2.2 GPa Polarizing plate B Thickness: 93 μm Modulus of elasticity: 3.2 GPa Pressure-sensitive adhesive layer Thickness: 20 μm Modulus of elasticity: $2 \times 10^{-3}$ GPa | Glass film Thickness: 100 μm Modulus of elasticity: 73 GPa Adhesive layer Thickness: 5 μm Modulus of elasticity: 2.2 GPa Polarizing plate C Thickness: 137 μm Modulus of elasticity: 3.6 GPa Pressure-sensitive adhesive layer Thickness: 20 μm Modulus of elasticity: $2 \times 10^{-3}$ GPa | Glass film Thickness: 100 μm Modulus of elasticity: 73 GPa Adhesive layer Thickness: 5 μm Modulus of elasticity: 2.2 GPa Polarizing plate D Thickness: 149 μm Modulus of elasticity: 3.2 GPa Pressure-sensitive adhesive layer Thickness: 20 μm Modulus of elasticity: $2 \times 10^{-3}$ GPa | Glass film Thickness: 70 μm Modulus of elasticity: 73 GPa Adhesive layer Thickness: 5 μm Modulus of elasticity: 2.2 GPa Polarizing plate B Thickness: 93 μm Modulus of elasticity: 3.2 GPa Pressure-sensitive adhesive layer Thickness: 20 μm Modulus of elasticity: $2 \times 10^{-3}$ GPa |
| Flexibility | Bending radius (mm) | 40 | 40 | 40 | 40 | 30 |
| | Evaluation | ○ | ○ | ○ | ○ | ○ |
| Puncture resistance | Puncture strength (kg) | 7.8 | 8.2 | 9.1 | 9.1 | 5.0 |
| | Evaluation | ○ | ○ | ○ | ○ | ○ |
| Pencil hardness | | 9H or more | 9H or more | 9H or more | 9H or more | 9H or more |
| Strength P $(10^{-4} (\mu m)^3 (GPa)^2)$ | | 742 | 1,041 | 1,318 | 1,303 | 510 |
| Total thickness (μm) | | 169 | 218 | 262 | 274 | 188 |

| | | Comparative Example 1 | Comparative Example 2 | Comparative Example 3 | Comparative Example 4 | Comparative Example 5 |
|---|---|---|---|---|---|---|
| Configuration | | Glass film Thickness: 50 μm Modulus of elasticity: 73 GPa Adhesive layer Thickness: 5 μm Modulus of elasticity: 2.2 GPa Polarizing plate A Thickness: 44 μm Modulus of elasticity: 2.1 GPa Pressure-sensitive adhesive layer Thickness: 20 μm Modulus of elasticity: $2 \times 10^{-3}$ GPa | Glass film Thickness: 50 μm Modulus of elasticity: 73 GPa Adhesive layer Thickness: 5 μm Modulus of elasticity: 2.2 GPa Polarizing plate B Thickness: 93 μm Modulus of elasticity: 3.2 GPa Pressure-sensitive adhesive layer Thickness: 20 μm Modulus of elasticity: $2 \times 10^{-3}$ GPa | Glass film Thickness: 50 μm Modulus of elasticity: 73 GPa Adhesive layer Thickness: 5 μm Modulus of elasticity: 2.2 GPa Polarizing plate C Thickness: 137 μm Modulus of elasticity: 3.2 GPa Pressure-sensitive adhesive layer Thickness: 20 μm Modulus of elasticity: $2 \times 10^{-3}$ GPa | Glass film Thickness: 100 μm Modulus of elasticity: 73 GPa Pressure-sensitive adhesive layer Thickness: 20 μm Modulus of elasticity: $2 \times 10^{-3}$ GPa Polarizing plate A Thickness: 44 μm Modulus of elasticity: 2.1 GPa Pressure-sensitive adhesive layer Thickness: 20 μm Modulus of elasticity: $2 \times 10^{-3}$ GPa | Glass film Thickness: 200 μm Modulus of elasticity: 73 GPa Pressure-sensitive adhesive layer Thickness: 20 μm Modulus of elasticity: $2 \times 10^{-3}$ GPa Polarizing plate A Thickness: 44 μm Modulus of elasticity: 2.1 GPa Pressure-sensitive adhesive layer Thickness: 20 μm Modulus of elasticity: $2 \times 10^{-3}$ GPa |
| Flexibility | Bending radius (mm) | ≤20 | ≤20 | 30 | 40 | 100≤ |
| | Evaluation | ○ | ○ | ○ | ○ | x |

TABLE 1-continued

| | | | | | | |
|---|---|---|---|---|---|---|
| Puncture resistance | Puncture strength (kg) | 1.4 | 1.8 | 2.0 | 7.0 | 32.0 |
| | Evaluation | x | x | x | x | ○ |
| Pencil hardness | | 9H or more | 9H or more | 9H or more | 9H or more | 9H or more |
| Strength P ($10^{-4}$ (μm)$^3$(GPa)$^2$) | | 185 | 260 | 312 | 265 | 1,062 |
| Total thickness (μm) | | 119 | 168 | 212 | 184 | 284 |

| | | Comparative Example 6 | Comparative Example 7 |
|---|---|---|---|
| Configuration | | Glass film<br>Thickness: 50 μm<br>Modulus of elasticity: 73 GPa<br>Pressure-sensitive adhesive layer<br>Thickness: 20 μm<br>Modulus of elasticity: $2 \times 10^{-3}$ GPa<br>Resin layer (TAC)<br>Thickness: 100 μm<br>Modulus of elasticity: 3.2 GPa<br>Pressure-sensitive adhesive layer<br>Thickness: 20 μm<br>Modulus of elasticity: $2 \times 10^{-3}$ GPa | TAC film<br>Thickness: 100 μm<br>Modulus of elasticity: 4.1 GPa<br>Pressure-sensitive adhesive layer<br>Thickness: 20 μm<br>Modulus of elasticity: $2 \times 10^{-3}$ GPa<br>Polarizing plate E<br>Thickness: 164 μm<br>Modulus of elasticity: 3.2 GPa<br>Pressure-sensitive adhesive layer<br>Thickness: 20 μm<br>Modulus of elasticity: $2 \times 10^{-3}$ GPa |
| Flexibility | Bending radius (mm) | ≤20 | ≤20 |
| | Evaluation | ○ | ○ |
| Puncture resistance | Puncture strength (kg) | 1.3 | — |
| | Evaluation | x | x |
| Pencil hardness | | 9H or more | 3H |
| Strength P ($10^{-4}$ (μm)$^3$(GPa)$^2$) | | 149 | 50 |
| Total thickness (μm) | | 190 | 304 |

REFERENCE SIGNS LIST 10 glass film
20 adhesive layer
30 resin layer
30' polarizing plate
31 protective film
32 polarizer
40 pressure-sensitive adhesive layer
100, 200 laminate for image display apparatus

The invention claimed is:

1. A laminate for an image display apparatus, comprising:
a glass film; and
a resin layer arranged on one side of the glass film,
the laminate for an image display apparatus comprises the glass film, an adhesive layer, the resin layer, and a pressure-sensitive adhesive layer in the stated order
wherein the glass film has a thickness of more than 50 μm and 150 μm or less, wherein the laminate for an image display apparatus has a puncture strength measured in conformity with JIS Z 1707:1997 of more than 2 kg and 50 kg or less,
wherein the laminate for an image display apparatus has a bending radius of from 15 mm to 200 mm,
wherein a ratio (modulus of elasticity of the adhesive layer/modulus of elasticity of the pressure-sensitive adhesive layer) of a modulus of elasticity of the adhesive layer at 23° C. to a modulus of elasticity of the pressure-sensitive adhesive layer at 23° C. is from 1 to 1,000 and
wherein the laminate for an image display apparatus has a strength P represented by the following equation (1) of 500 ($10^{-4}$ (μm)$^3$(GPa)$^2$) or more:

$$P = tg^2 \times Eg\left(ta_1 \times \sqrt{Ea_1} + \frac{tp \times Ep}{50} + ta_2 \times \sqrt{Ea_2}\right) \quad (1)$$

in the equation (1), Eg represents a modulus of elasticity of the glass film at 23° C., tg represents a thickness of the glass film, $Ea_1$ represents a modulus of elasticity of the adhesive layer at 23° C., $ta_1$ represents a thickness of the adhesive layer, Ep represents a modulus of elasticity of the resin layer at 23° C., tp represents a thickness of the resin layer, Eat represents a modulus of elasticity of the pressure-sensitive adhesive layer at 23° C., and tae represents a thickness of the pressure-sensitive adhesive layer.

2. The laminate for an image display apparatus according to claim 1, wherein the resin layer is a polarizing plate.

3. The laminate for an image display apparatus according to claim 2,
wherein the polarizing plate includes a polarizer and a protective film arranged on one side of the polarizer, and
wherein the protective film and the polarizer are arranged in the stated order from a glass film side.

4. The laminate for an image display apparatus according to claim 1, wherein the resin layer has a modulus of elasticity at 23° C. of from 2 GPa to 10 GPa.

5. The laminate for an image display apparatus according to claim 1, wherein the pressure-sensitive adhesive layer has a modulus of elasticity at 23° C. of from 0.00001 GPa to 10 GPa.

* * * * *

UNITED STATES PATENT AND TRADEMARK OFFICE
CERTIFICATE OF CORRECTION

PATENT NO. : 11,760,077 B2
APPLICATION NO. : 16/759811
DATED : September 19, 2023
INVENTOR(S) : Takeshi Murashige et al.

It is certified that error appears in the above-identified patent and that said Letters Patent is hereby corrected as shown below:

In the Claims

Change
Column 18, Line 51:
thickness of the resin layer, Eat represents a modulus of
To be:
thickness of the resin layer, $Ea_2$ represents a modulus of Change
Column 18, Line 53:
C., and tae represents a thickness of the pressure-
To be:
C., and $ta_2$ represents a thickness of the pressure- Signed and Sealed this
Twenty-seventh Day of August, 2024

Katherine Kelly Vidal
*Director of the United States Patent and Trademark Office*